United States Patent [19]

Foote

[11] Patent Number: 5,524,488

[45] Date of Patent: Jun. 11, 1996

[54] FLUX CONTROL GROOVE

[75] Inventor: Steven A. Foote, Issaquah, Wash.

[73] Assignee: AlliedSignal Inc., Morristown, N.J.

[21] Appl. No.: 186,057

[22] Filed: Jan. 24, 1994

[51] Int. Cl.⁶ .................................................. G01P 15/13
[52] U.S. Cl. ..................... 73/514.23; 73/514.31
[58] Field of Search ........................... 73/497, 519, 520, 73/517 B, 517 R, 493, 518, 514.39, 519.01, 519.02, 514.17, 514.23, 514.31; 336/30; 335/304, 296; 324/152, 151 A; 310/68 B

[56] References Cited

U.S. PATENT DOCUMENTS

| | | | |
|---|---|---|---|
| 2,832,932 | 4/1958 | Baermann | 73/520 |
| 4,182,187 | 1/1980 | Hanson | 73/517 B |
| 4,186,609 | 2/1980 | Baermann | 73/520 |
| 4,250,757 | 2/1981 | Hanson | 73/517 B |
| 4,394,405 | 7/1983 | Atherton | 427/58 |
| 4,399,700 | 8/1983 | Hanson | 73/517 B |
| 4,400,979 | 8/1983 | Hanson et al. | 73/517 B |
| 4,441,366 | 4/1984 | Hanson | 73/517 B |
| 4,555,944 | 12/1985 | Hanson et al. | 73/517 B |
| 4,555,945 | 12/1985 | Hanson | 73/517 B |
| 4,592,234 | 6/1986 | Norling | 73/517 B |
| 4,620,442 | 11/1986 | MacGugan et al. | 73/517 R |
| 4,697,455 | 10/1987 | Norling | 73/517 B |
| 4,726,228 | 2/1988 | Norling | 73/517 B |
| 4,932,258 | 6/1990 | Norling | 73/497 |
| 4,944,184 | 7/1990 | Blake et al. | 73/517 B |
| 5,024,089 | 6/1991 | Norling | 73/517 B |
| 5,085,079 | 2/1992 | Holdren et al. | 73/517 B |
| 5,090,243 | 2/1992 | Holdren et al. | 73/517 B |
| 5,097,172 | 3/1992 | Becka | 310/348 |
| 5,111,694 | 5/1992 | Foote | 73/517 B |
| 5,182,949 | 2/1993 | Rupnick et al. | 73/517 B |
| 5,194,771 | 3/1993 | Otsuki | 310/68 R |
| 5,203,210 | 4/1993 | Terry et al. | 73/517 B |
| 5,212,984 | 5/1993 | Norling et al. | 73/497 |
| 5,220,831 | 6/1993 | Lee | 73/497 |

Primary Examiner—Hezron E. Williams
Assistant Examiner—Christine K. Oda

[57] ABSTRACT

A force rebalance accelerometer includes a proof mass suspended by one or more flexures between stationary mounted upper and lower excitation rings. Pick-off capacitance plates formed on opposing sides of the proof mass are used to form upper and lower capacitance elements whose capacitance varies in response to displacement of the proof mass to provide a displacement signal. The displacement signal is applied to one or more electromagnets which are used to force the proof mass back to a null or at-rest position. The drive current applied to the electromagnets thus represents the force or acceleration applied to the accelerometer. The electromagnets include a magnet, rigidly secured to an excitation ring which forms a magnetic return path. A flux control groove is formed in the excitation ring to reduce leakage flux and flux concentration which would otherwise result in the magnetic return path at the magnet interface. By relieving the stress and leakage flux at the magnet interface, the accelerometer in accordance with the present invention will provide relatively stable output signals and not be particularly sensitive to temperature or environmental variations while providing relatively stable thermal hysteresis and drift performance.

10 Claims, 2 Drawing Sheets

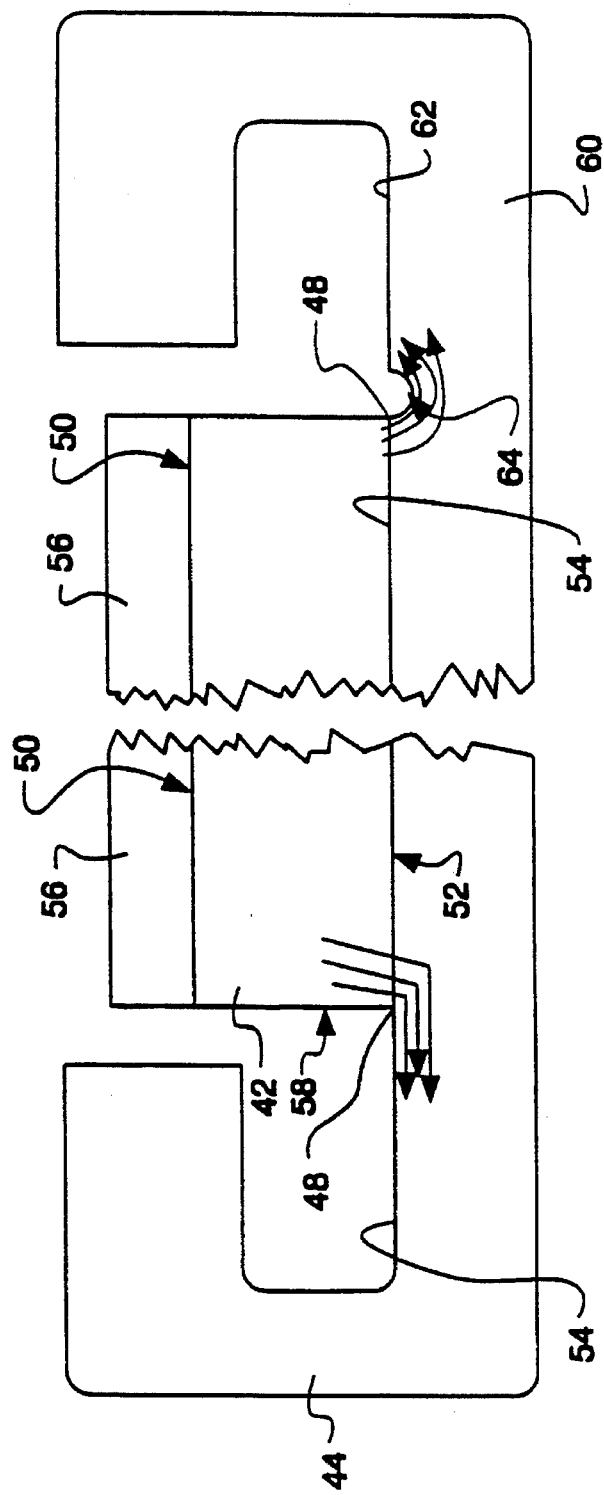

FLUX CONTROL GROOVE

BACKGROUND OF THE INVENTION

1. Field of the Invention

The present invention relates to an accelerometer and, more particularly, to a flux control groove for reducing magnetic stress and flux leakage at the magnet interface of a force rebalance accelerometer which includes a proof mass suspended between one or more magnet assemblies.

2. Description of the Prior Art

Force rebalance accelerometers which include a proof mass suspended between one or more magnet assemblies are generally known in the art. Examples of such accelerometers are disclosed in U.S. Pat. Nos. 4,182,187; 4,250,757; 4,394,405; 4,399,700; 4,400,979; 4,441,366; 4,555,944; 4,555,945; 4,592,234; 4,620,442; 4,697,455; 4,726,228; 4,932,258; 4,944,184; 5,024,089; 5,085,079; 5,090,243; 5,097,172; 5,111,694; 5,182,949; 5,203,210; 5,212,984; and 5,220,831, all herein incorporated by reference. Such force rebalance accelerometers normally include a proof mass, known to be formed from amorphous quartz, suspended by one or more flexures to enable the proof mass to deflect in response to forces or accelerations along a sensitive axis, generally perpendicular to the plane of the proof mass. At rest, the proof mass is normally suspended equidistantly between upper and lower excitation rings. Electrically conductive material forming pick-off capacitance plates, is disposed on opposing sides of the proof mass to form capacitive elements with the excitation rings. An acceleration or force applied along the sensitive axis causes the proof mass to deflect either upwardly or downwardly which, in turn, causes the distance between the pick-off capacitance plates and the upper and lower excitation rings to vary. This change in the distance between the pick-off capacitance plates and the upper and lower excitation rings causes a change in the capacitance of the capacitive elements. The difference in the capacitances of the capacitive elements is thus representative of the displacement of the proof mass along the sensitive axis. This displacement signal is applied to a servo system that includes one or more electromagnets which function to return the proof mass to its null or at-rest position. The magnitude of the drive currents applied to the electromagnets, in turn, is representative of the acceleration or force along the sensitive axis.

The electromagnets used in such accelerometers are known to include a magnet that is normally bonded to a excitation ring or flux concentrator formed from a material having a relatively high permeability, such as Invar, to form a magnetic return path. Unfortunately, the configuration of the excitation ring at the magnet interface is known to cause saturation at a region of the excitation ring adjacent the interface. This saturated region of the excitation ring tends to make the accelerometer particularly sensitive to temperature and environmental variations, which significantly effects the accuracy of the device. In addition, the relatively high permeability of the excitation ring immediately adjacent the magnet tends to draw flux leakage from the sides of the magnet which results in degraded thermal hysteresis and drift performance.

SUMMARY OF THE INVENTION

It is an object of the present invention to solve various problems associated with the prior art.

It is yet another object of the present invention to provide a force rebalance accelerometer which minimizes saturation of the excitation ring.

It is yet another object of the present invention to provide a force rebalance accelerometer which provides relatively stable output during conditions of temperature and environmental variations.

It is yet another object of the present invention to provide a force rebalance accelerometer which provides relatively stable thermal hysteresis and drift performance.

Briefly, the present invention relates to a force rebalance accelerometer which includes a proof mass suspended by one or more flexures between stationary mounted upper and lower excitation rings. Pick-off capacitance plates formed on opposing sides of the proof mass are used to form upper and lower capacitance elements whose capacitance varies in response to displacement of the proof mass to provide a displacement signal. The displacement signal is applied to one or more electromagnets, used to force the proof mass back to a null or at-rest position. The drive current applied to the electromagnets thus represents the force or acceleration applied to the accelerometer. The electromagnets include a magnet, rigidly secured to a pole piece which forms a magnetic return path. A flux control groove is formed in the excitation ring to reduce leakage flux and flux concentration which would otherwise result in saturation in the magnetic return path at the magnet interface. By relieving the magnetic stress and leakage flux at the magnet interface, the accelerometer in accordance with the present invention will provide relatively stable output signals and not be particularly sensitive to temperature or environmental variations while providing relatively stable thermal hysteresis and drift performance.

BRIEF DESCRIPTION OF THE DRAWING

These and other objects of the present invention will be readily understood with reference to the following detailed description and attached drawing, wherein:

FIG. 3A is a partial cross-sectional view of a known pole piece used to form a magnetic return path; and FIG. 3B is a partial cross-sectional view of a pole piece formed with a flux control groove in accordance with the present invention.

DETAILED DESCRIPTION OF THE PREFERRED EMBODIMENT

Figure 1:
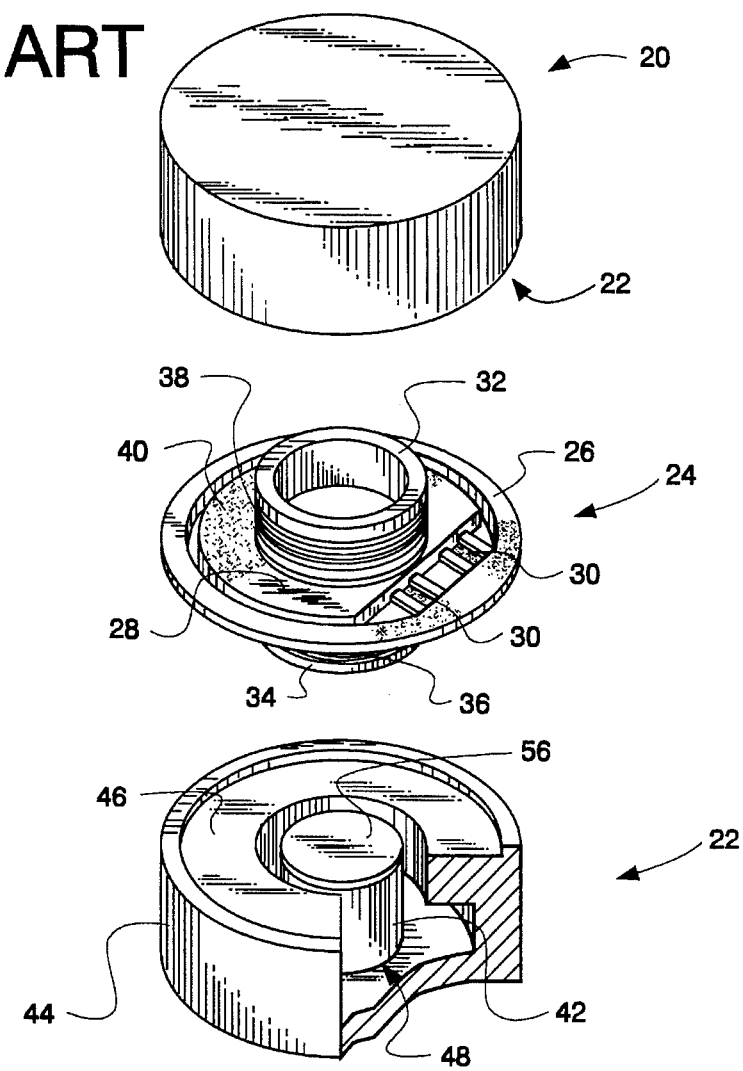
FIG. 1 is an exploded perspective view of a known force rebalance accelerometer.

FIG. 1 illustrates a known force rebalance accelerometer, generally identified with the reference numeral 20. The force rebalance accelerometer includes one or more magnet assemblies 22 and a proof mass assembly 24. The proof mass assembly 24 includes a mounting ring 26 and a generally paddle-shaped proof mass 28. The proof mass 28 is suspended relative to the mounting ring 26 by way of a pair of flexures 30 to enable the proof mass 28 to rotate relative to the mounting ring 26. Cylindrically shaped bobbins 32 and 34 are formed on opposing surfaces of the proof mass 28. The bobbins 32 and 34 are used to carry torquer coils 36 and 38. Conductive material 40 is deposited on the opposing surfaces of the proof mass 28 to form pick-off capacitance plates.

The magnet assemblies 22 include a permanent magnet 42 and a generally cylindrical excitation ring or flux concentrator 44. The excitation ring 44 is configured to have a generally C-shaped cross section. The material for the excitation ring 44 is selected to have relatively high permeability, such as Invar, to form a magnetic return path. Inwardly facing surfaces 46 on the excitation rings 44 which, in combination with the conductive material 40 formed on the opposing sides of the proof mass 28 form variable capacitance elements PO1 and PO2 as shown in FIGS. 1 and 2.

Figure 2:
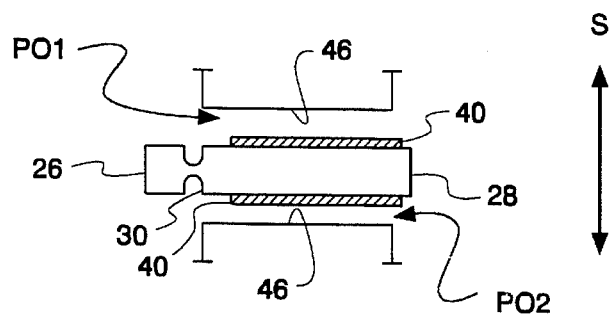
FIG. 2 is a simplified cross-sectional view of a known force rebalance accelerometer.

Referring to FIG. 2, the proof mass 28 is shown at an at-rest or null position. In this position, the distance between the upper and lower excitations rings 44 and the pick-off capacitance plates 40 are equal. Since capacitance is a function of the distance between the plates, the capacitance values of the capacitors PO1 and PO2 are equal during this condition.

In response to an acceleration or force along a sensitive axis S, generally perpendicular to the plane of the proof mass 28, the proof mass 28 moves toward one or the other of the excitation rings 44. This displacement of the proof mass 28 changes the respective distances between the pick-off capacitance plates 46 formed on the opposing sides of the proof mass 28 relative to the upper and lower excitation rings 44. This change in the distance results in a change in the capacitance of the capacitive elements PO1 and PO2. Circuitry for measuring this change in capacitance is disclosed in U.S. Pat. No. 4,634,965 and co-pending application Ser. No. 08/151,417 filed on Nov. 12, 1993 by Paul W. Rashford and entitled "IMPROVEMENT OF CHARGE BALANCING CIRCUIT" and incorporated herein by reference.

The difference in the values of the capacitances PO1 and PO2 is representative of the displacement of the proof mass 28 either upwardly or downwardly along the sensitive axis S. This displacement signal is applied to a servo system which includes the magnet assemblies 22 and the torquer coils 36 which form electromagnets to return the proof mass 28 to its null position. The magnitude of the drive current to the electromagnets is a measure of the acceleration of the proof mass 28 along the sensitive axis S.

As mentioned above, there are certain problems inherent in such force rebalance accelerometers which result from the magnet 42 to excitation ring 44 interface 48. In particular, due to the saturation of the excitation ring 44 at this interface 48, known force rebalance accelerometers are sensitive to temperature and environmental variations. More particularly, as illustrated in FIG. 3A, the interface between the magnet 42 and the pole piece 44 forms a relatively sharp corner. Such a configuration results in sharp bending and crowding of the magnetic flux in the magnetic return path formed by the excitation ring 44. Such crowding of the flux at the interface thus tends to saturate the excitation ring 44 in that region. Saturation of a region of the excitation ring 44, in turn, causes the output signal of the accelerometer to be sensitive to temperature and environmental variations.

There are other known problems associated with the configuration of the interface 48. In particular, with reference to FIG. 3A, the magnet 42 is shown with its opposing pole faces 50 and 52 forming North and South magnetic poles. One of the pole faces 50 or 52 is rigidly secured to a base portion 54 of the excitation ring 44. Pole piece 56 may be rigidly secured to the other pole face 50, 52 of the magnet 42. With such a configuration, the proximity of the relatively high permeability material forming a base portion 54 of the excitation ring 44 tends to draw leakage flux from the sides 58 of the magnet, intermediate the pole faces 50 and 52. This leakage flux, in turn, results in degraded thermal hysteresis and drift performance.

The excitation ring in accordance with the present invention, generally identified with the reference numeral 60, solves these problems. In particular, the excitation ring 60 is formed in a generally cylindrical shape with a C cross section. The magnet 42 is centrally secured to a base portion 62 of the excitation ring 60. In order to relieve the magnetic stress resulting from the relatively sharp corner formed at the interface 48, a circular flux control groove 64 is formed adjacent the magnet-to-pole face interface 48. This flux control groove 64 is formed with a generally semicircular cross section and extends around the entire magnet 42. By forming a flux control groove 64 around the magnet, the magnetic stress and saturation of the base portion 62 of the excitation ring 60 is significantly relieved. In particular, the semicircular cross section flux control groove forces the magnetic flux lines from the pole face 52 of the magnet 42 to bend and follow the relatively broader radius of the groove and avoid saturation crowding. In addition, the width of the groove 64 while not isolating the pedestal formed at the magnet-pole face interface 48 eliminates a magnetic return path immediately proximate the magnet 42 thus reducing, if not eliminating, leakage flux from the side 58 of the magnet.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A force rebalance accelerometer, comprising:

a proof mass;

a mounting ring;

a pair of flexures for flexibly connecting the proof mass to the mounting ring;

means for returning the proof mass to a null position, said returning means including a magnet having opposing pole faces bonded at one of said pole faces to an excitation ring defining an interface; and means for preventing saturation of the excitation ring in a region adjacent said interface, said preventing means disposed circumferentially about said pole face at said interface.

2. A force rebalance accelerometer as recited in claim 1, wherein said preventing means includes means for reducing leakage flux from said magnet.

3. A force rebalance accelerometer as recited in claim 1, wherein said preventing means includes means for reducing flux concentration in said excitation ring adjacent said magnet.

4. A force rebalance accelerometer as recited in claim 1, wherein said excitation ring is formed with a generally cylindrical shape having a "C" cross section defining a base portion.

5. A force rebalance accelerometer as recited in claim 4, wherein said magnet is rigidly secured to said base portion of said excitation ring defining said interface.

6. A force rebalance accelerometer as recited in claim 5, wherein said preventing means includes a groove disposed adjacent said interface.

7. A force rebalance accelerometer, comprising:

a proof mass;

a mounting ring;

a pair of flexures for flexibly connecting the proof mass to the mounting ring;

means for returning the proof mass to a null position, said returning means including a magnet having opposing pole faces bonded at one of said pole faces to an excitation ring defining an interface; and means for reducing flux concentration from the magnet, said flux reducing means disposed circumferentially about said pole face at said interface.

8. A force rebalance accelerometer as recited in claim 7, wherein said excitation ring is formed with a generally cylindrical shape having a "C" cross-section defining a base portion.

9. A force rebalance accelerometer as recited in claim 8, wherein said magnet is rigidly secured to said base portion of said excitation ring defining said interface.

10. A force rebalance accelerometer as recited in claim 9, wherein said reducing means includes a groove disposed adjacent said interface.

* * * * *